US006477532B1

(12) United States Patent
Duliege

(10) Patent No.: US 6,477,532 B1
(45) Date of Patent: Nov. 5, 2002

(54) PROCESS FOR THE REMOTE PUBLISHING OF MUSICAL SCORES

(75) Inventor: François Duliege, Le Perreux-sur-Marne (FR)

(73) Assignee: Net4music S.A. (FR)

( * ) Notice: Subject to any disclaimer, the term of this patent is extended or adjusted under 35 U.S.C. 154(b) by 0 days.

(21) Appl. No.: 09/343,774

(22) Filed: Jun. 30, 1999

(51) Int. Cl.[7] .......................... G06F 17/30; G06F 15/16; G06F 17/60

(52) U.S. Cl. .......................... 707/10; 709/200; 709/201; 709/202; 709/203; 705/1

(58) Field of Search .................................. 713/171, 168; 705/271, 1; 704/233; 84/477; 707/10, 200, 201, 202; 709/200, 201, 202, 203; 360/60

(56) References Cited

U.S. PATENT DOCUMENTS 5,900,564 A * 5/1999 Kurakake .................... 84/477
5,907,443 A * 5/1999 Hirata .......................... 360/60
5,983,176 A * 11/1999 Hoffert et al. .............. 704/233
6,032,130 A * 2/2000 Alloul et al. ............... 705/271
6,226,618 B1 * 5/2001 Downs et al. ................. 705/1
6,233,682 B1 * 5/2001 Fritsch ........................ 713/168
6,247,130 B1 * 6/2001 Fritsch ........................ 713/171
6,263,313 B1 * 7/2001 Milsted et al. ................. 705/1

* cited by examiner

*Primary Examiner*—Frantz Coby
(74) *Attorney, Agent, or Firm*—Schnader Harrison Segal & Lewis LLP

(57) ABSTRACT

Process for the remote publishing of musical scores, characterized in that a data base comprising a file of digitized scores and a file comprising search criteria are stored in the memory of a server, with the server having communication means for access to the search file by a remote client workstation, and for receiving specific digital data sent by the client workstation to the server, and means for generating a download file corresponding to the merger of the specific digital data and the selected digitized score file, with said downloadable file being a digital image file comprising means to limit the number of reproduction.

7 Claims, No Drawings

PROCESS FOR THE REMOTE PUBLISHING OF MUSICAL SCORES

FIELD OF THE INVENTION

The present invention pertains to the field of publishing musical scores, and more specifically the publishing of digitized musical scores.

BACKGROUND

The publishing of musical scores is traditionally implemented by means of conventional printing methods. This requires the maintenance of a stock of scores by the dealer, and creates availability problems due to the large number of musical scores in the repertoire, and the relatively limited number of musicians and their geographic dispersion.

In the state of the art, information systems have been proposed for the printing of musical scores. As an example, European patent EP 53393 describes a musical-score printing system comprising:

1. a musical-data input device for inputting the data on a musical score into said system;
2. a data processing system for processing the data originating from said musical-data input device in predetermined processing codes;
3. a first memory for storing the processing codes output by said data processing device;
4. an editing device for editing the output from the first memory according to a predetermined program;
5. a second memory for storing the musical codes output by said editing device; a character memory for storing the printing matrices corresponding to said musical codes;
6. and a photocomposition machine for forming a proof copy of said musical score as a function of the musical codes stemming from said second memory and the printing matrices stemming from said character memory.

This equipment enables simplification and automation of the publishing of musical scores, but does not make it possible to resolve the problem of the optimal distribution of the scores.

The object of the present invention is to propose a process that provides for the instantaneous availability of musical scores in all locations, with the possibility of personalizing the published scores.

DETAILED DESCRIPTION

The invention entails a remote publishing process and system for personalized scores, notably so as to allow schools of music or musical groups to publish personalized scores.

For this purpose, the invention pertains, in its broadest meaning, to a process for the remote publishing of musical scores, characterized in that a data base comprising a file of digitized scores and a file comprising search criteria are stored in the memory of a server, with the server having communication means for access to the search file by a remote client workstation, and for receiving specific digital data sent by the client workstation to the server, and means for generating a downloadable file corresponding to the merger of the specific digital data and the selected digitized score file, with said downloadable file being a digital image file comprising means to limit the number of reproductions.

The downloadable image file preferably has means to limit the number of printings by the client workstation.

Activation of the downloading is advantageously contingent on the receipt by the server of a confirmation of an online payment.

According to a preferred mode of implementation, the server has means for displaying on the client workstation a search criteria input screen for the selection of the desired search criterion or criteria.

The server preferably has means for displaying on the client workstation a presentation screen of the products corresponding to the client's search in the form of a table comprising the principal information pertaining to the products.

According to a variant, the server has means for displaying on the client workstation a presentation screen of the details of a selected product.

According to a preferred mode of implementation, the server has steganographic means for marking the downloaded image files with a unique identifier.

The invention will be described below in the form of a nonlimitative example of implementation.

The objective of the invention is to add the possibility of personalization along with protection against the illegal copying of musical scores when sold on the Internet. The concept consist on the one hand of making copying more difficult and on the other hand of encouraging the buyer to want an original since it will be personalized.

Personalization is manifested as a text and/or images that are added to the cover page of the score. This text or these images can be entirely known by the server (for example: Score of the XXX Edition concert numbered no. 1/100), or entirely known by the buyer (for example: To Allan, for his birthday), or composed of a text or images originating in part from the server and in part from the buyer.

The score and its cover page are originally in the form of a PDF file.

Upon the command, the text is superimposed on the PDF file, then the entire unit is encrypted and provided with an electronic key which makes it unusable on a machine other than that of the buyer. The downloaded file allows a number of printings determined by the purchase that was implemented, after which the file is only accessible as a display (solely on the buyer's client workstation).

The printable digitized files are obtained by the clients on their own computer or on terminals located in music stores or conservatories.

The server comprises:

The electronic commerce application itself which allows the clients to purchase a score and to obtain it immediately by downloading.

An electronic directory of the musical scores.

Means for communicating on a network, especially the Internet.

The following information must be maintained for each musical work:

Original title of the work

Localized titles (n)

Language (n)

First and last names of the composers (n)

First and last names of the authors (n)

Name of the original publisher

Country of origin

Name of the local publisher and applicable territory. (For each different local publisher, a different score will be recorded so as to avoid problems of conflicted updating by multiple publishers of the same recording).

First and last names of the performer or of the group.

Duration of the musical work in minutes.

Year of the initial copyright filing.

Instrument employed (n) (predefined list).

Adaptation: original, or name of the arrangement and arranger (1: different adaptation=different score).

Type of product (predefined list): Instrumental score, words, words with guitar chords, teaching methods.

Possibly MIDI files, compressed sound files.

Number of pages.

Image of the product.

List of the selections.

General description.

Internal editor reference.

The work's identification code.

A downloadable product.

The following information will be available for the online purchase:

Price.

File size.

Approximate downloading time.

This directory of scores is intended for use by distributors and the public at large. The screens described below should be as refined as possible (in terms of size of the HTML pages).

First screen: Entry of the search criteria.

The user, upon connection to the site, will have immediate access to the search criteria input screen. He can search on a single criterion or on 2 simultaneous criteria.

Thus, he will start by selecting the desired search criterion or criteria, from among the following:

Artist's first or last name (author/composer/performer) *

Word from a title or a selection (the full text search will be performed on the contents of the field "original title", the fields "localized titles" and the fields "selections") *

Word contained in the description *

Instrument (from the list of predefined values)

Type of product (from list of predefined values)

* The word search can be implemented on the basis of whole words, the initial characters of a word or using jokers or wild cards. For example, looking for *yla would find all of the scores by Bob Dylan.

Example: the user searches for saxophone scores of selections composed by John Lennon:

In the scrolling list of the criterion types for the first criterion, he selects "Artist's name".

In the entry field for criterion 1, he enters "John"

In the scrolling list of criterion types for criterion 2, he selects "Instrument"

In the criterion 2 entry field, he obtains the scrolling list of instruments and clicks on "saxophone".

Second option for the first screen: selection of the artist from among multiple artists.

If the user requested a selection based on the first or last name of an author, composer or performer, and more than one artist corresponds to the term that he entered, a screen "1 bis" presents the list of the artists corresponding to his search, and requests that he select the desired artist.

Example: he entered "John", the system responds: Elton John, John Lennon, Johnny Hallyday, etc. and the user clicks on "John Lennon".

Second Screen: List of the corresponding products.

The system presents to the user:

The number of products corresponding to his search

The list of these products, on multiple screens if necessary, at the rate of circa 10 products per screen (at the bottom of each screen, possibility of advancing to the following screens or returning to the preceding screens of the list or of returning to the search criteria input screen)

Each "product list" screen presents the principal information regarding the products in table form:

Localized and original name of the musical work, adaptation, artists, original and local publisher, type of product, instruments, a downloadable product that can be ordered.

Example:

| Work | Adaptation | Artists | Publisher | Type of product | Instrument | Can be ordered |
|---|---|---|---|---|---|---|
| Let It Be | | Lennon, McCartney | Original: Warner Local: Brasil Editions | Score | Saxophone, Piano | NO |
| Imagine | Credit Agricole advertisement | Lennon | Warner | Score | Saxophone, Guitar | YES |
| Easy Pop Saxophone Lessons (contains a lesson based on the piece "Jealous Guy" by John Lennon) | | Professor XXX; Lennon | BMG | Teaching method | Saxophone | NO |

Third screen: Details on a product.

By clicking on one of the products on the list, one obtains a "detail" screen giving all of the specific information on this product, i.e., displaying all the data on the product.

The following functions are possible during the session:

Transfer to an artist's site from the display of the artists' names

Transfer to the publisher's site from the display of the publisher's name.

Transfer to the server's electronic commerce site if at least one "Can be ordered"="YES".

1. Functional Specifications of the "Updating" Function

In addition, this directory must be updated on a very regular basis and, given the volume of the data, in the most automated manner possible.

In order to achieve this, each publisher must provide a file, extracted from its own information management system, which contains in a predefined format:

Either all of the data, intended to replace the previous data submitted by the same publisher Or only the updated data.

This file is transmitted by the publisher to the server via an electronic message sent to a specific address. The contents of the mailbox are regularly inspected by a program which upon ascertaining the receipt of a file, sends a confirmation message to the publisher and triggers the interface program.

An automatic interface program imports the contents of this file into the directory, operating in the process a certain number of automatic verifications (type of data by field, certain fields cannot be empty, comparison of certain fields with a list of predefined data, etc.→rejection of a registration list in the case of error). It sends an e-mail message to the publisher to inform it of the error-containing registration list and the fact that the remainder of the file was imported.

This importation takes place in an intermediary database which allows a final verification by a responsible party at the publisher, or better at the server, of the quality of these data before replication to the production database.

If the publisher is large, this justifies the server creating or causing the creation of a personalization of the publisher's information management system to enable generation of the interface file in the correct format.

If the publisher is not large enough to justify the IMC creating or causing the creation of a personalization of the publisher's information management system, the publisher then has three choices:

→ Either it can itself implement the adaptation of its information management system to generate the interface file in the correct format: the publisher merely needs to be provided with the format of the file to be generated.

→ Or the publisher can decide to use, for the daily management of its scores, an application that was supplied to the publisher by the server for replacing its present application and which, in addition to corresponding to the publisher's present requirements, allows it to generate the interface file in the correct format.

→ Or the publisher can decide to manually update the server's database. This creates a duplication of the data entry process, since the publisher will have already updated its own internal database. For the server, this assumes the installation of an Extranet enabling the publishers to connect (authentication by password) to the "intermediary" database, to modify the relevant data and validate it. In conclusion, it is necessary to provide for:

The officialization of a glossary of keywords common to all of the publishers: predefined list of instruments, product types, etc.

The format of the interface file.

The mechanism for the automatic updating of an intermediary database from a preformatted file received via e-mail.

The mechanism for the manual updating of an intermediary database via Extranet, with authentication, etc.

Automatic and manual control procedures, and for adding IMC information to the data transmitted by the publishers (especially the "can be ordered" information).

The replication procedure between the intermediary database and the production database.

The Access tool to be supplied to the applicable publishers.

The marking of the downloaded files is implemented by steganographic techniques comprised of including in the digital image file a digital signature calculated by a cryptographic program, with this signature being transformed into graphic data integrated in an invisible manner in the digital image file.

The server contains a database containing:

the addressee of the downloaded file, the identification of the downloaded file, the authorized number of reproductions or printings, the signature associated with the downloaded file.

What is claimed is:

1. A process for remote publishing of musical scores comprising:

storing in a memory of a server a data base comprising a file of digitized scores and a file comprising search criteria;

providing access to the server via a communication means for access to the search criteria by a remote client workstation;

receiving selected digital data sent by the client workstation to the server;

generating a downloadable file from a merger of the selected digital data and a selected digitized score file, wherein the downloadable file is a digital image file having means to limit the number of reproductions; and transferring or permitting transfer of the downloadable file to the remote client workstation.

2. The process according to claim 1, wherein the downloadable image file further comprises means for limiting the number of printings by the client workstation.

3. The process according to claim 1, wherein activation of downloading is contingent on receipt by the server of a confirmation of an online payment.

4. The process according to claim 1, wherein the server further comprises means for displaying on the client workstation a search criteria input screen for the selection of a desired search criterion or criteria.

5. The process according to claim 1, wherein the server further comprises means for displaying on the client workstation a presentation screen of products corresponding to a search, in the form of a table comprising principal information regarding products.

6. The process according to claim 5, wherein the server further comprises means for displaying on the client workstation a presentation screen of details of a selected product.

7. The process according to claim 1, wherein the server further comprises steganographic means for marking image files with a unique identifier.

* * * * *